United States Patent [19]

Rohner et al.

[11] Patent Number: 4,878,732

[45] Date of Patent: Nov. 7, 1989

[54] OPTICAL COMMUNICATION CABLE WITH RIBBON WAVEGUIDE SUPPORT

[75] Inventors: Peter Rohner, Isernhagen; Gerhard Ziemek, Langenhagen, both of Fed. Rep. of Germany

[73] Assignee: kabelmetal electro Gesellschaft mit beschränkter Haftung, Hanover, Fed. Rep. of Germany

[21] Appl. No.: 24,739

[22] Filed: Mar. 11, 1987

[30] Foreign Application Priority Data

Mar. 11, 1986 [DE] Fed. Rep. of Germany ......... 367970
Dec. 22, 1986 [DE] Fed. Rep. of Germany ....... 3643886

[51] Int. Cl.$^4$ .............................................. G02B 6/44
[52] U.S. Cl. .................................................. 350/96.23
[58] Field of Search ..................................... 350/96.23

[56] References Cited

U.S. PATENT DOCUMENTS

| 4,110,001 | 8/1978 | Olszewski et al. | 350/96.23 |
| 4,185,887 | 1/1980 | Ferrentino | 350/96.23 |
| 4,199,225 | 4/1980 | Slaughter et al. | 350/96.23 |
| 4,241,979 | 12/1980 | Gagen et al. | 350/96.23 |
| 4,515,435 | 5/1985 | Anderson | 350/96.23 |
| 4,557,560 | 12/1985 | Bohannon, Jr. et al. | 350/96.23 |
| 4,632,506 | 12/1986 | Taylor | 350/96.23 |
| 4,709,983 | 12/1987 | Plessner et al. | 350/96.23 |
| 4,709,984 | 12/1987 | Oestreich et al. | 350/96.23 |
| 4,744,631 | 5/1988 | Eichenbaum et al. | 350/96.23 |

FOREIGN PATENT DOCUMENTS 2815514 10/1978 Fed. Rep. of Germany .
60-144709 7/1985 Japan ................................ 350/96.23

OTHER PUBLICATIONS

Miller, "Laminated Fiber Ribbon for Optical Communication Cables", *The Bell System Technical Journal*, vol. 55, No. 7, Sep. 1976, pp. 929–935, 350/96.23.

Primary Examiner—John D. Lee
Attorney, Agent, or Firm—Martin A. Farber

[57] ABSTRACT

A light-wave conductor cable is described within the core of which there is at least one ribbon line (1) in which light-wave conductors (2) are arranged alongside of and parallel to each other. The light-wave conductors (2) are enclosed between two ribbons (3, 4) the material of which has the same coefficient of thermal expansion as the light-wave conductors (2). The ribbons (3, 4) consist preferably of fiberglass-reinforced plastic. The ribbon line (1) may be disposed within an outer jacket (20), and therein arranged straight or curved or, in the case of several ribbon lines (1), in ordered or random fashion and about a core of the light-wave conductor cable.

21 Claims, 1 Drawing Sheet

OPTICAL COMMUNICATION CABLE WITH RIBBON WAVEGUIDE SUPPORT

FIELD AND BACKGROUND OF THE INVENTION

The present invention relates to a communication cable having light-wave conductors and a jacket of high tensile strength, within a care of which and surrounded by the jacket, there is at least one ribbon line in which the light-wave conductors are held fast, extending parallel to each other between two ribbon-shaped supports (Federal Republic of Germany OS 28 15 514).

Light-wave conductors are finished structures of glass fibers which are suitable for the transmitting of light waves without additional treatment. Such light-wave conductors are used in communications engineering as a substitute for the previous customary metal conductors. They have a number of advantages over metal conductors. Light-wave conductors are very wide-band and low in attenuation so that more channels can be transmitted over a conductor with increased distance between repeaters. They can be readily bent and have small diameters so that the cross section of the cable can be reduced. Furthermore, they are not affected by external electric or magnetic fields.

For the use of light-wave conductors for transmission purposes in transmission engineering they must be worked into light-wave conductor cables. In this connection it must been noted that the light-wave conductors are not damaged either during manufacture or upon a transportation or laying of the light-wave conductor cable. Since they are brittle and have only slight extensibility it is necessary to proceed very carefully upon their manufacture. The light-wave conductors must, however, also be arranged in such protected manner in the light-wave conductor cable that their functionality is permanently assured.

In the known light-wave conductor cable according to the aforementioned Federal Republic of Germany OS 28 15 514, the light-wave conductors are combined in a pre-manufacturing stage into ribbon lines. The ribbon-shaped supports present protection for the light-wave conductors upon their further processing. At least one such ribbon line is embedded, in the case of this light-wave conductor cable, within a jacket which is developed as a profiled body with armoring wires. The ribbon line with the light-wave conductors is arranged loosely within a longitudinally extending bore in the profiled body. The ribbon lines used here have only a small number of light-wave conductors. Since only one ribbon line is to be arranged in each borehole of the profiled body, the number of light-wave conductors to be arranged in this known light-wave conductor cable is therefore very limited if the dimensions of the profiled body and thus the dimensions of the light-wave conductor cable are to remain within ordinary limits. The manufacture of this known light-wave conductor cable is furthermore very expensive since the ribbon line with the light-wave conductors must be pulled into the bore in the profiled body. This is possible only for relatively short lengths of cable. Furthermore, no information concerning the development of the ribbon-shaped supports for the ribbon line can be noted from the forgoing publication. These supports are evidently intended to serve only to hold the light-wave conductors together until they are introduced into the bore of the profiled body.

SUMMARY OF THE INVENTION

The object of the invention is to provide a light-wave conductor cable having light-wave conductors combined in a ribbon line and in which, with the smallest possible dimensions, a large number of light-wave conductors are arranged in a manner which is effectively protected.

This object is achieved in accordance with the invention in a light-wave conductor cable of the aforementioned type in the manner that the light-wave conductors are laminated between two ribbons provided on one side with an adhesive layer and bonded both to the light-wave conductors and to each other, their coefficient of thermal expansion corresponding to that of the light-wave conductors.

The advantage of ribbon lines is optimally utilized with this light-wave conductor cable. Within the ribbon line a plurality of light-wave conductors are arranged one alongside the other, in which connection they can thereby also be very simply connected with each other or connected to apparatus. This is true, in particular, if the light-wave conductors lie alongside of each other in a predetermined raster.

By lamination between the two ribbons, the light-wave conductors are furthermore held immovably over their entire length and furthermore protected well from moisture and from damage by bending or kinking. The composite unit consisting of two ribbons with the light-wave conductors lying between them imparts to the ribbon line the mechanical stability necessary for this. This stability is retained under all conditions to which a light-wave conductor cable is subjected. This applies, in particular, also to influences of temperature, which cannot have a negative effect because a material having a coefficient of thermal expansion corresponding to that of the light-wave conductors is used for the ribbons. Therefore no temperature-produced relative movements can take place between the light-wave conductors and the ribbons. In a preferred embodiment, the ribbons consist of a plastic which is reinforced by fiber-glass.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
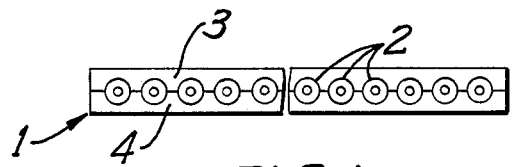
FIG. 1 is a cross section through a ribbon line for a light-wave conductor cable according to the invention.

In the ribbon line 1 shown in FIG. 1 a number of light-wave conductors 2 are contained between two ribbons 3 and 4 which are provided on one side with a layer of adhesive. The adhesive layers of the ribbons 3 and 4 face each other upon the manufacture of the ribbon line 1 so that, upon lamination they are bonded to the light-wave conductors 2 and, in the intermediate spaces between them as well as at the edges, to each other.

As already mentioned, within the ribbon line 1 there are contained a number of light-wave conductors 2 all of which can be simultaneously connected to each other or connected to other apparatus by means of corresponding connecting elements or splicing devices. This is true, in particular, if the light-wave conductors 2 lie alongside of each other in a predetermined raster over the entire width of the ribbon line 1. For example, 10 to 60 light-wave conductors 2 can lie alongside of each other in a ribbon line 1.

The ribbons 3 and 4 consist of a material the temperature coefficient of which corresponds to that of the light-wave conductors 2. In that way, the result is obtained that variations in temperature do not have an effect on the ribbon line 1. In a preferred embodiment, any desired fiberglass reinforced plastic can be used as material for the ribbons 3 and 4.

Figure 2:
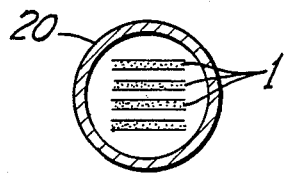
FIGS. 2 to 6 are cross sections through different embodiments of the light-wave conductor cable.
Figure 3:
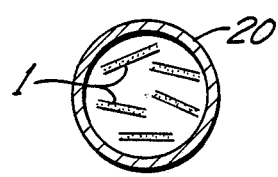
Figure 4:
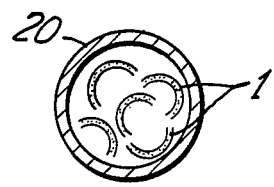

If several ribbon lines 1 are to be arranged in a light-wave conductor cable, they can then be arranged one above the other in the manner shown in FIG. 2. However, it is also possible to arrange the ribbon lines 1 in random fashion within the cross section of the light-wave conductor cable, as shown in FIG. 3. In this case, they can also, as shown in FIG. 4, be curved around their longitudinal axis, whereby their flexibility as a whole is improved.

Figure 5:
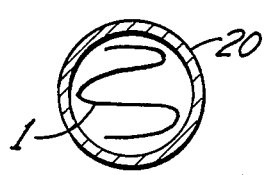
Figure 6:
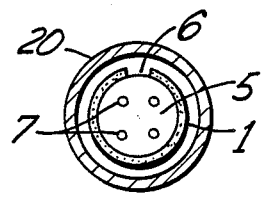
Figure 7:
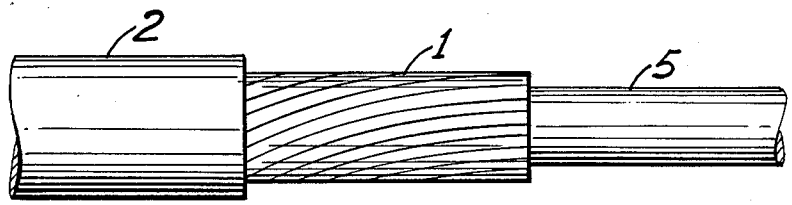
FIG. 7 shows a light-wave conductor cable with layers successively removed.

However, it is also possible to arrange within the core of the light-wave conductor cable only one ribbon line 1 the width of which is greater than the diameter of the cable 1. In order that the cross section in a light-wave conductor cable having such a wide ribbon line 1 can be filled up as well as possible, the ribbon line 1 is suitably curved. There are various possibilities for this:

As shown in FIG. 5, the ribbon line 1 can, for instance, be folded along its longitudinal direction so that an approximately circular or sinuous form results as envelope. In the embodiment shown in FIG. 6, the ribbon line 1 is curved around a core 5 in the form of open tube. This tubular structure has a slit 6 which extends in the longitudinal direction of the cable. This tubular structure is also preferably twisted around its longitudinal axis so that the slit 6 extends helically with a long lay. The core 5 can consist of any desired material within which, in principle, elements of high tensile strength can be arranged. However, it is also possible to arrange ordinary copper wires within the core 5, they being used for communication with traditional devices when a light-wave conductor cable is laid. The ribbon line 1 can also be wound around the core 5, as shown in FIG. 7 preferably with a loong lay. In this case the individual turns of the ribbon line 1 can overlap each other.

In all embodiments, the light-wave conductor cable has a jacket 20 of high tensile strength which can be applied by methods known from cable construction technique. The jacket 20 can, for instance, be a closed metal tube which is formed from a longitudinally entering ribbon and welded together with a longitudinal seam. Such a ribbon may consist, for instance, of steel. It is also possible to corrugate such a tube transverse to its longitudinal direction so as to impart greater bendability to it. The jacket 20 of high tensile strength can, however, also consist of thinner sheet-like metal ribbon which is stabilized by threads of high tensile strength. Such threads can, for instance, consist of steel or of polyaramide. In principle, the jacket 20 of high tensile strength may be of any desired construction. Assurance must be had that it can take up essential tensile forces such as may occur, for instance, upon the laying of the light-wave conductor cable. A layer of plastic can possibly be further provided over the jacket of high tensile strength.

Figure 8:
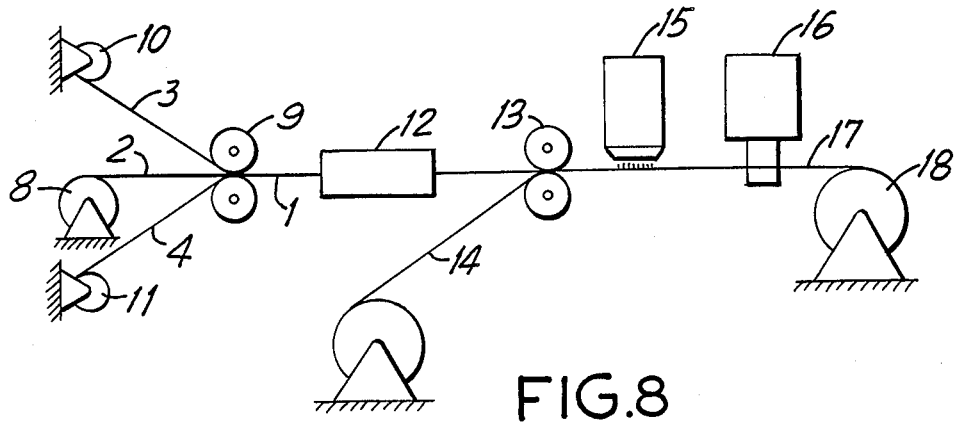
FIG. 8 shows diagrammatically an apparatus for the manufacture of the light-wave conductor cable.

For the manufacture of a light-wave conductor cable which contains at least one ribbon line 1 such as shown in FIG. 1, one may proceed for instance, as follows:

With reference to FIG. 8, light-wave conductors 2 are removed from a number of bobbins 8 corresponding to the desired number of light-wave conductors 2 and led to a pair of rolls 9. Ribbons 3 and 4 are furthermore introduced into the pair of rolls 9, the ribbons 3 and 4 being supplied from bobbins 10 and 11. The two ribbons 3 and 4 are brought up to the light-wave conductors 2 from different sides. By means of the pair of rolls 9, the light-wave conductors are laminated between the two ribbons 3 and 4 so that the final ribbon line 1 emerges from the pair of rolls 9.

In a following shaping device 12, the ribbon line 1 can be folded for instance in the manner shown in FIG. 2. Around the ribbon line 1, which has been folded in this way there is shaped, in a shaping stage 13, a metal ribbon 14 which is drawn off from a bobbin. From this there is produced the jacket 20 (FIGS. 2-6) of high tensile strength in accordance with the above embodiments. The jacket 20 can be welded with a longitudinal seam in a station 15. The station 15 can, however, also serve to bond a thin metal ribbon stabilized by threads of high tensile strength on an overlap place which extents in longitudinal direction. A layer of plastic can be applied by an extruder 16 in the same operation onto the jacket 20. The finished light-wave conductor cable 17 can then be wound on a bobbin 18.

The light-wave conductor cable 17 can, corresponding to the above remarks, therefore be produced in a single operation, including the manufacture of the ribbon line 1. In principle, however, it is also possible to procuce the ribbon line 1 in advance and introduce it only later on into a light-wave conductor cable. In particular, in the case of the last-mentioned manner of procedure it is also possible to arrange two or more ribbon lines 1 in one light-wave conductor cable.

The light-wave conductor cables 2 are protected not only mechanically but also against moisture by the laminating in the ribbon line 1. The light-wave conductor cable 17 can also be developed as a whole as moisture-protected and, in particular, as longitudinally water-tight if all cavities within the jacket 20 are filled with sealing material. Such a material can, for instance, be a petrojelly having a base of petroleum jelly which is customary in cable construction techique. In principle, however, foamable material can also be used.

We claim:

1. A communication cable comprising:
   a jacket of high tensile strength;
   a core surrounded by the jacket, there being disposed in the core at least one ribbon line comprising two ribbon-shaped supports, there being optical waveguides fixed in place extending parallel to each other between the two ribbon-shaped supports;
   wherein, to produce a flexible and easy treatable ribbon line of high tensile strength, the optical waveguides are laminated between the two ribbon-shaped supports of said at least one ribbon line, the ribbon-shapped supports being made of plastic which is reinforced with fiberglass, the ribbon-shaped supports having a coefficient of thermal expansion essentially equal to that of the optical waveguides, the ribbon-shaped supports each being provided on one side with an adhesive layer and being bonded both to the optical waveguides and to each other, the adhesive and the plastic providing sufficient flexibility to said ribbon line to permit a longitudinal flexing of the ribbon line.

2. A cable according to claim 1, wherein the cable comprises a plurality of ribbon lines, in the core of a cable, said ribbon lines being arranged in ordered fashion one above the other.

3. A cable according to claim 1, wherein the cable comprises a plurality of ribbon lines in the core of a cable, said ribbon lines being arranged at random therein.

4. A cable according to claim 3, wherein a ribbon line is bent around its longitudinal axis.

5. A cable according to claim 1, wherein the width of the ribbon line is greater than the diameter of the cable, and the ribbon line is formed in curved shape within the jacket.

6. A cable according to claim 1, wherein the ribbon line is folded transverse to its longitudinal direction within the core of the cable.

7. A cable according to claim 1, wherein the ribbon line is wound around a longitudinal axis of the cable within the core of the cable.

8. A cable according to claim 1, further comprising a central core element in the core of the cable; and wherein the ribbon line is bent in tubular shape around the core element, leaving a slit which is continuous in longitudinal direction.

9. A cable according to claim 1, further comprising a central core element in the core of the cable; and wherein the ribbon line is wound with a long lay around the core element which lay extends in the longitudinal direction of the cable.

10. A cable according to claim 1, wherein the jacket is a corrugated metal jacket.

11. A cable according to claim 1, wherein the jacket comprises a metal ribbon which is stabilized by threads of high tensile strength.

12. A cable according to claim 1, wherein hollow spaces within the jacket are filled with sealing material.

13. A communication cable comprising:
a jacket of high tensile strength;
a core surrounded by the jacket, there being disposed in the core at least one ribbon line comprising two ribbon-shaped supports, there being optical waveguides fixed in place extending parallel to each other between the two ribbon-shaped supports;
wherein, to produce a flexible and easy treatable ribbon line of high tensile strength, the optical waveguides are laminated between the two ribbon-shaped supports of said at least one ribbon line, the ribbon-shaped supports being made of plastic which is reinforced with fiberglass, and the ribbon-shaped supports having a coefficient of thermal expansion essentially equal to that of the optical waveguides; and
the optical waveguides are spaced apart from each other defining intermediate spaces between the optical waveguides, the ribbon-shaped supports each being provided on one side with an adhesive layer and being bonded both to the optical waveguides and to each other at the edges and in the intermediate spaces of a ribbon line, the adhesive and the plastic providing sufficient flexibility to said ribbon line to permit a longitudianal flexing of the ribbon line.

14. A cable according to claim 13, wherein the cable comprises a plurality of ribbon lines arranged alongside and spaced apart from each other.

15. A cable according to claim 14, wherein at least one of said plurality of ribbon lines has a curved shape as viewed in transverse cross section of the cable.

16. A cable according to claim 13, wherein a ribbon line has a curved shaped as viewed in transverse cross section of the cable.

17. A cable according to claim 16, wherein a width of the ribbon line is greater than a diameter of the cable.

18. A cable according to claim 16, wherein the ribbon line extends in helical fashion along the cable.

19. A cable according to claim 13, wherein the ribbon line extends in helical fashion along the cable.

20. A method of manufacturing a communication cable, the cable comprising:
a jacket of high tensile strength;
light-wave conductors within the jacket;
a core and two ribbon-shaped supports surrounded by the jacket, there being disposed about the core at least one ribbon line in which the light-wave conductors are fixed in place extending parallel to each other between the two ribbon-shaped supports; and wherein
the light-wave conductors are laminated between the two ribbon-shaped supports of the ribbon line, the ribbon-shaped supports each being provided on one side with an adhesive layer, the ribbon-shaped supports being bonded both to the light-wave conductors and to each other and having a coefficient of thermal expansion essentially equal to that of the light-wave conductors;
the method of manufacturing the cable comprising the steps of:
extending a plurality of light-wave conductors parallel to each other between two ribbon-shaped supports;
providing each of the two ribbon-shaped supports on one side with an adhesive layer in order to form a ribbon line;
laminating the ribbon-shaped supports to each other and to the light-wave conductors;
curving the ribbon line transverse to its longitudinal direction to form a structure having an approximately circular cross-section surface; and
forming a jacket of high tensile strength around the bent ribbon line.

21. A method of manufacturing a communication cable, the cable comprising:
a jacket of high tensile strength;
light-wave conductors within the jacket;
a core and two ribbon-shaped supports surrounded by the jacket, there being disposed about the core at least one ribbon line in which the light-wave conductors are fixed in place extending parallel to each other between the two ribbon-shaped supports; and wherein the light-wave conductors are laminated between the two ribbon-shaped supports of the ribbon line, the light-wave conductors are spaced apart from each other defining intermediate spaces between the light-wave conductors, the ribbon-shaped supports each being provided on one side with an adhesive layer, the ribbon-shaped supports being bonded both to the light-wave conductors and to each other at the edges and in the intermediate spaces of a ribbon line, and the ribbon-shaped supports having a coefficient of thermal expansion essentially equal to that of the light-wave conductors;

the method of manufacturing the cable comprising the steps of:

extending a plurality of light-wave conductors parallel to and spaced apart from each other between two ribbon-shaped supports, there being intermediate spaces between the conductors;

providing each of the two ribbon-shaped supports on one side with an adhesive layer in order to form a ribbon line;

laminating the ribbon-shaped supports to each other at the edges and in the intermediate spaces of a ribbon line and to the conductors;

curving the ribbon line transverse to its longitudinal direction to form a structure having an approximately circular cross-section surface; and forming a jacket of high tensile strength around the bent ribbon line.

* * * * *